March 7, 1967

C. F. STEARNS

3,307,353

FUEL CONTROL

Filed Jan. 15, 1964

INVENTOR
CHARLES F. STEARNS
BY Norman Friedland
ATTORNEY

FIG. 7

3,307,353
FUEL CONTROL
Charles F. Stearns, East Longmeadow, Mass., assignor to United Aircraft Corporation, East Hartford, Conn., a corporation of Delaware
Filed Jan. 15, 1964, Ser. No. 337,904
5 Claims. (Cl. 60—39.28)

This invention relates to fuel controls and more particularly to fuel controls for controlling turbine types of power plants.

As is generally well known in the art, the fuel control is a combination of metering devices and computing mechanism serving to control the flow of fuel to the engine in an amount commensurate with efficient and optimum engine operation, yet assuring that a malfunction due to surge, rich or lean flame out and overtemperature does not ensue. Overtemperature in this instance means that temperature which will adversely affect the components of the engine.

Basically, the metering system of the fuel control selects the rate of fuel flow to be supplied to the engine burners in accordance with the amount of thrust (for pure jet) or horsepower (for turboprops and jets driving a variable load such as the rotor blades of a helicopter) demanded by the pilot, but subject to engine operating limitations as scheduled by the computing system as a result of its monitoring various engine operational parameters. As is realized, the computing system of the fuel control senses and combines the various parameter to control the output of the metering section during all regimes of engine operation.

In the heretofore known fuel controls for turbine power plants, such as the type described and claimed in Patent No. 2,822,666 granted to S. G. Best, engine scheduling is accomplished by relating all the operational parameters being monitored by the fuel control in terms of scheduled ratio of $W_f/P_3$, where $W_f$ is fuel flow in pounds per hour, $P_3$ is absolute compressor discharge pressure. It is important to understand here that this ratio of $W_f/P_3$ is a value "built" into the fuel control by virtue of cams, linkages, levers and the like which value represents the desired engine operation. Hence, the ratio $W_f/P_3$ may be considered to be a scheduled value, which for any given speed (r.p.m.) of the engine's rotor (compressor and/or turbine) defines all the operations of the engine.

In these heretofore fuel controls utilizing the $W_f/P_3$ control parameter, the computing mechanism computes the various monitored engine operation parameters and converts these parameters in terms of this $W_f/P_3$ ratio. The fuel control also senses the actual compressor discharge pressure and feeds this signal to the multiplying mechanism of the computing system which also receives the $W_f/P_3$ ratio signal. Here these two signals are multiplied for obtaining the product "$W_f$" of the two. This "$W_f$" signal is then transmitted to the fuel metering devices for metering sufficient amount of fuel to produce the desired thrust or horsepower. Basically, such a system describes the control philosophy for both acceleration and steady state engine operation.

As is known in this art, the highest obtainable rate of acceleration is always desirable in turbine types of power plants, and obviously, this is accomplished by placing the metering devices in their full flow position. Owing to the fact that the component parts of the engine can only tolerate a certain maximum temperature and that the compressor is subject to surge (a pressure pulsating condition that occurs at any particular given speed, at a given pressure ratio or given weight flow of the compressor) the computing system must assure that these conditions as well as rich and lean flame out do not ensue. These regimes of operation are computed by the fuel control computing system which senses and combines various engine operating parameters.

The heretofore system such as the one noted in the Best patent, supra, utilizes a three-dimensional cam for computing the fuel rate necessary to avoid the maximum temperature and surge. The three-dimensional cam is best described as a cam having movement in an axial and rotational direction in response to selected engine operating conditions and operates to give the temperature and surge limits. As mentioned above, the fuel control computing system must compute the value of the preselected engine operational parameters in terms of $W_f/P_3$ ratio so that it will be compatible with the multiplication system. The three-dimensional cam serves this purpose for acceleration scheduling. This is accomplished by having the cam move in one direction in response to compressor speed and having it move in another direction in response to compressor inlet temperature. The cam follower responding to the radius of the cam develops a signal whose value corresponds to the desired $W_f/P_3$ value.

The cam's profile comprises a plurality of curves superimposed thereon defining the engine's operational characteristics in terms of $W_f/P_3$ as a function of inlet temperature of the compressor and compressor speed. To more fully appreciate the present invention, it is worthy to note that the engine's surge and temperature characteristics can be defined for all engine operations in terms of $W_f/P_3$ vs. engine speed. In such a plot it will be appreciated that both surge and temperature form a family of curves where each curve of the family depends on the value of the compressor inlet temperature. As is obvious to one skilled in this art the turbine inlet temperature for any given speed of the compressor and value of $W_f/P_3$ varies as a function of compressor inlet temperature.

As is well known by those familiar with the heretofore known fuel controls, surge and temperature limits are each represented by a family of curves for the overall engine operation. It is also well known that the conventional three-dimensioned cam was the only known practical device capable of defining a schedule representing two separate families of curves varying as a function of two independent input signals. Owing to this fact, it has been the heretofore practice to utilize a three-dimensional cam in this heretofore known fuel control.

It is a purpose of this invention to completely eliminate the three-dimensional cam yet obtain accurate acceleration limit scheduling mechanism. We have found that this is made possible by utilizing $W_f \theta_2^x/P_3$ versus $N^2/\theta_2$ or $N/\sqrt{\theta_2}$ as the control parameters instead of the heretofore known $W_f/P_3$ versus N control parameters; where N=the r.p.m. of engine rotating mechanism; $\theta_2$=temperature of the air upstream of the compressor and $x$=an exponential value.

By utilizing the $W_f \theta_2^x/P_3$ vs. $N^2/\theta_2$ as the control parameters, the maximum temperature limit schedule and surge limit schedule can each be represented by a single function of the parameters. This is a complete departure from the heretofore known fuel control philosophy since as was described above, the family of curves representing surge and temperature become nonexisting. Owing to this fact the need of a three-dimensional cam is completely eliminated.

It will be appreciated that the elimination of the three-dimensional cam is a major break-through in this art not only because it eliminates a costly item, but also because it allows independent and separate scheduling of the temperature and surge of the acceleration schedule. Hence, adjustment of either the surge or temperature limit schedule can be accomplished independently.

Other features and advantages will be apparent from the specification and claims and from the accompanying drawings which illustrate an embodiment of the invention.

In order to appreciate this invention it is necessary to understand that the maximum temperature limit schedule of a gas turbine engine can be represented by a single function of the parameters $W_f \theta_2^x / P_3$ and $N/\sqrt{\theta_2}$ and that the surge limit schedule can be represented by a single function of the parameters $W_f / P_3 \sqrt{\theta_2}$ and $N/\sqrt{\theta_2}$.

Thus, the problem solved by this invention is to modify the $W_f / P_3$ parameter which changes with varying compressor inlet temperature to obtain constant turbine inlet temperature at any given corrected speed, i.e., $N/\sqrt{\theta_2}$. It is within the scope of this invention if the terms (parameters) are computed in static or total values.

The following mathematical derivation shows how the engine characteristics have been computed to show that a single line function of $W_f \theta_2^x / P_3$ versus corrected engine speed will hold actual turbine inlet temperature at a constant value for any value of engine inlet temperature. Small second order effects have been ignored in the derivation.

The following notations will be used for deriving the parameter $W_f \theta_2^x / P_3$:

$N/\sqrt{\theta_2}$ = Corrected engine speed in revolutions per minute
$W_a \sqrt{\theta_2}/\delta_2$ = Corrected engine airflow in pounds/second
$\Gamma_4$ = Turbine inlet flow number
$P_3/P_2$ = Corrected compressor pressure ratio
$\eta_c$ = Compressor efficiency
$T_3/\theta_2$ = Corrected compressor outlet temperature in degrees (2°) Rankine
$\Delta P_b/P_3$ = Burner pressure loss
$\Delta T_b/\theta_2$ = Corrected burner temperature rise in degree (°) Rankine
$W_f/\delta_2 \sqrt{\theta_2}$ = Corrected engine fuel flow in pounds/hour
$\eta_b$ = Combustion efficiency
$W_g = W_a + W_f$ = weight of gas = weight of air + weight of fuel $T_4/\theta_2$ = Corrected inlet turbine temperature in degrees (°) Rankine $P_4/P_5$ = Turbine pressure ratio $q_t$ = Fuel heating value in $$\frac{\text{British thermal units}}{\text{pound}}$$

$C_p$ = Specific heat at constant pressure in $$\frac{\text{British thermal units}}{\text{pound (°) Rankine}}$$

$K$ = Ratio of specific heats $C_p/C_v$ $$\theta_2 = \frac{T_2}{T_0} = \frac{T_2}{518.4°R}$$

$$\theta_4 = \frac{T_4}{T_0} = \frac{T_4}{518.4°R}$$

$$\delta_2 = \frac{P_2}{P_0} = \frac{P_2}{14.7 \text{p.s.i.a.}}$$

$$\delta_4 = \frac{P_4}{P_0} = \frac{P_4}{14.7 \text{p.s.i.a.}}$$

$d$ = Sign for derivative $\phi$ = Constant

The subscripts listed below indicate the location within the engine unless indicated otherwise:

Where:
2 is at the inlet of the compressor
3 is at the outlet of the compressor
4 is at the inlet of the turbine
5 is at the discharge of the turbine
6 is at the tailpipe
$b$ is at the burner To satisfy the requirement stated immediately above, first it is necessary to find the interrelationship that exists between the corrected ratio unit $W_f/P_3\sqrt{\theta_2}$ and corrected turbine inlet temperature $T_4/\theta_2$ at any particular corrected engine speed $N/\sqrt{\theta_2}$.

Turbine inlet air flow is commonly expressed as a flow number $\Gamma_4$, where (1) $$\Gamma_4 = \frac{W_g \sqrt{T_4}}{A_4 P_4}$$

Using the calculus this may be differentiated to the form (2) $$\frac{d\Gamma_4}{\Gamma_4} = \frac{dW_g}{W_g} + \frac{1}{2}\frac{dT_4}{T_4} - \frac{dP_4}{P_4} - \frac{dA_4}{A_4}$$

Recognizing that the turbine inlet area is of fixed geometry, and ignoring minor second order effects, this may be re-expressed as (3) $$\frac{dP_3}{P_3} = \frac{dW_a}{W_a} + \frac{1}{2}\frac{dT_4}{T_4} - \frac{d\Gamma_4}{\Gamma_4}$$

The general expression for ratio units in terms of other parameters within the engine is (4) $$\frac{W_f}{P_3} = \frac{3600 C_p A_4 \Gamma_4 \left(1 - \frac{\Delta P_b}{P_3}\right) \Delta T_b}{\eta_b q_t \left(1 + \frac{W_f}{W_a}\right)\sqrt{T_4}}$$

Using the calculus and ignoring minor second order terms this may be differentiated to the form (5) $$\frac{d\frac{W_f}{P_3}}{\frac{W_f}{P_3}} = \frac{d\Gamma_4}{\Gamma_4} + \frac{d\Delta T_b}{\Delta T_b} - \frac{1}{2}\frac{dT_4}{T_4}$$

The burner temperature rise is simply (6) $$\Delta T_b = T_4 - T_3$$

The rate of change of burner temperature rise is then (7) $$\frac{d\Delta T_b}{\Delta T_b} = \frac{T_4}{\Delta T_b}\frac{dT_4}{T_4} - \frac{T_3}{\Delta T_b}\frac{dT_3}{T_3}$$

For an adiabatic compression as occurs in a gas turbine engine compressor, the compressor temperature ratio is approximately (8) $$\frac{T_3}{T_2} = \left(\frac{P_3}{P_2}\right)^{\frac{K-1}{K\eta_c}}$$

This may be differentiated to the form (9) $$\frac{dT_3}{T_3} = \frac{K-1}{K\eta_c}\frac{dP_3}{P_3}$$

Equations 7 and 9 may be combined to the form (10) $$\frac{d\Delta T_b}{\Delta T_b} = \frac{T_4}{\Delta T_b}\frac{dT_4}{T_4} - \frac{T_3}{\Delta T_b}\frac{K-1}{K\eta_c}\frac{dP_3}{P_3}$$

Equations 10 and 5 may be combined to the form (11)
$$\frac{d\frac{W_f}{P_3}}{\frac{W_f}{P_3}} = \frac{dT_4}{T_4} + \frac{T_4}{\Delta T_b}\frac{dT_4}{T_4} - \frac{T_3}{\Delta T_b}\frac{K-1}{K\eta_c}\frac{dP_3}{P_3} - \frac{1}{2}\frac{dT_4}{T_4}$$

Combining Equations 11 and 3 and collecting similar terms (12)
$$\frac{d\frac{W_f}{P_3}}{\frac{W_f}{P_3}} = \left[1 - \frac{T_3}{\Delta T_b}\frac{K-1}{K\eta_c}\right]\frac{dT_4}{T_4}$$
$$+ \left[\frac{T_4}{\Delta T_b} - \frac{T_3}{\Delta T_b}\frac{K-1}{2K\eta_c} - \frac{1}{2}\right]\frac{dT_4}{T_4} - \left[\frac{T_3}{\Delta T_b}\frac{K-1}{K\eta_c}\right]\frac{dW_a}{W_a}$$

Equation 12 then is a general expression for the rate of change of ratio units in terms of the rates of change of the turbine inlet flow number, turbine inlet temperature and engine inlet air flow. At any constant corrected engine speed (which is a condition of the original problem statement) there is very little, if any, variation of turbine inlet flow number due to changes in any other thermodynamic parameter, especially when the turbine nozzles are choked, as they are in most engines over the greatest part of their useful operating spectrum. Equation 12 may therefore be simplified to (13)
$$\frac{d\frac{W_f}{P_3}}{\frac{W_f}{P_3}} = \left[\frac{T_4}{\Delta T_b} - \frac{T_3}{\Delta T_b}\frac{K-1}{2K\eta_c} - \frac{T_3}{\Delta T_b} - \frac{1}{2}\right]\frac{dT_4}{T_4} - \left[\frac{T_3}{\Delta T_b}\frac{K-1}{K\eta_c}\right]\frac{dW_a}{W_a}$$

To get the desired expression for the rate of change of ratio units in terms of the rate of change of turbine inlet temperature, it is necessary to establish the relationship between the rates of change of air flow and turbine inlet temperature at constant corrected speed. In the art, compressor performance is commonly depicted in a graphical chart form called a "compressor map" or "compressor characteristic." FIG. 1 will be recognized as a portion of such a compressor map, showing a portion of a single corrected speed line and two turbine inlet temperature lines, A and B. Value C is the change in engine air flow which will occur when going from turbine inlet temperature value A to value B at constant engine speed. Value D is the change which would occur in compressor pressure ratio going from turbine inlet temperature value A to value B at constant engine air flow. Obviously then (14)
$$dP_3\bigg|_{W_a=\phi} = \frac{dP_3}{dW_a}\bigg|_{T_4=\phi} \cdot dW_a + \frac{dP_3}{dW_a}\bigg|_{N=\phi} \cdot dW_a$$

Figure 1:
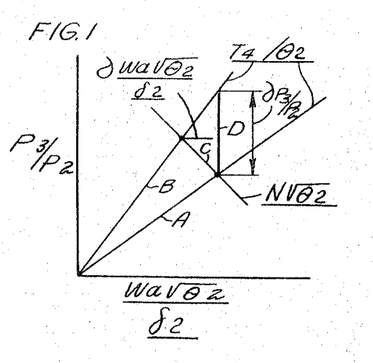
FIG. 1 is a graphical illustration used to facilitate the derivation of the control parameter.

(See FIG. 1.)

Equation 14 may be rewritten to the form (15)
$$dW_a = \frac{dP_3\big|_{W_a=\phi}}{\frac{dP_3}{dW_a}\big|_{T_4=\phi} + \frac{dP_3}{dW_a}\big|_{N=\phi}}$$

Expressed as percentage rates of change (16)
$$\frac{dW_a}{W_a} = \frac{\frac{dP_3}{P_3}\big|_{W_a=\phi}}{\frac{\frac{dP_3}{P_3}}{\frac{dW_a}{W_a}}\big|_{T_4=\phi} + \frac{\frac{dP_3}{P_3}}{\frac{dW_a}{W_a}}\big|_{N=\phi}}$$

From Equation 3 and the problem statement it is obvious that (17)
$$\frac{dP_3}{P_3}\bigg|_{W_a=\phi} = \frac{1}{2}\frac{dT_4}{T_4}$$

and that (18)
$$\frac{\frac{dP_3}{P_3}}{\frac{dW_a}{W_a}}\bigg|_{T_4=\phi} = 1$$

also (19)
$$\frac{\frac{dP_3}{P_3}}{\frac{dW_a}{W_a}}\bigg|_{N=\phi} = \frac{1}{\frac{\frac{dW_a}{W_a}}{\frac{dP_3}{P_3}}\big|_{N=\phi}}$$

where
$$\frac{\frac{dW_a}{W_a}}{\frac{dP_3}{P_3}}\bigg|_{N=\phi}$$

is the reciprocal of the absolute value of the slope of the compressor map speed line.

Using Equations 17, 18 and 19, Equation 16 may then be expressed as (20)
$$\frac{\frac{1}{2}\frac{dT_4}{T_4}}{1 + \frac{\frac{dW_a}{W_a}}{\frac{dP_3}{P_3}}\big|_{N=\phi}} = \frac{dW_a}{W_a}$$

Combining Equations 20 and 13 and collecting terms, (21)
$$\frac{d\frac{W_f}{P_3}}{\frac{W_f}{P_3}} = \left[\frac{T_4}{\Delta T_b} - \frac{T_3}{\Delta T_b}\frac{K-1}{2K\eta_c}\left(\frac{1}{\frac{dW_a}{W_a}}\frac{dP_3}{P_3} + 1\right) - \frac{1}{2}\right]\frac{dT_4}{T_4}$$

Using the corrected quantity equivalents of the parameters, Equation 21 may be expressed as (22)
$$\frac{d\frac{W_f}{P_3\sqrt{\theta_2}}}{\frac{W_f}{P_3\sqrt{\theta_2}}} = \left[\frac{\frac{T_4}{\theta_2}}{\frac{\Delta T_b}{\theta_2}} - \frac{\frac{T_3}{\theta_2}}{\frac{\Delta T_b}{\theta_2}}\frac{K-1}{2K-c}\left(\frac{1}{\frac{dW_a}{W_a}}\frac{dP_3}{P_3} + 1\right) - \frac{1}{2}\right]\frac{\frac{dT_4}{\theta_2}}{\frac{T_4}{\theta_2}}$$

Equation 22 then expresses the interrelationship that exists between the corrected ratio unit $W_f/P_3\sqrt{\theta_2}$ and corrected turbine inlet temperature $T_4/\theta_2$ at any particular corrected engine speed $N/\sqrt{\theta_2}$ with minor second order terms being ignored.

The differential form, Equation 22 may now be expanded to (23)
$$\frac{d\frac{W_f}{P_3}}{\frac{W_f}{P_3}} - \frac{1}{2}\frac{d\theta_2}{\theta_2} =$$

$$\left[\left[\frac{\frac{T_4}{\theta_2}}{\frac{\Delta T_b}{\theta_2}}-\frac{\frac{T_3}{\theta_2}}{\frac{\Delta T_b}{\theta_2}}\right]\frac{K-1}{2K\eta_c}\left(\frac{1}{\frac{dW_a}{W_a}}+1\right)-\frac{1}{2}\right]\left[\frac{dT_4}{T_4}-\frac{d\theta_2}{\theta_2}\right]$$

Since the desire is to find a single value function of $W_f/P_3$ and $\theta_2$ which will hold actual $T_4$ constant regardless of the value of $\theta_2$, $dT_4/T_4$ must equal zero. Recognizing this, collecting terms and simplifying (24)

$$\frac{d\frac{W_f}{P_3}}{\frac{W_f}{P_3}}+\left[\frac{T_4}{\Delta T_b}-\frac{T_3}{\Delta T_b}\frac{K-1}{2K\eta_c}\left(\frac{1}{\frac{dW_a}{W_a}}+1\right)-1\right]\frac{d\theta_2}{\theta_2}=0$$

Letting the coefficient between the brackets be represented by the arbitrary symbol "$x$" and using the calculus to integrate Equation 24

(25) $\qquad W_f\theta_2^x/P_3 = \text{constant}$

That is to say, if at any particular value of corrected engine speed a constant value of $W_f\theta_2^x/P_3$ is scheduled to the engine, then actual turbine inlet temperature will not vary regardless of the value of engine inlet temperature ratio $\theta_2$. The actual value of ratio units scheduled to the engine will be (26) $\qquad \frac{W_f}{P_3}=\frac{W_f\theta_2^x}{P_3}\cdot\frac{1}{\theta_2^x}$ As can be seen from Equation 24 the $x$ exponent contains terms related to burner temperature rise, compressor discharge temperature, compressor efficiency, and the slope of the compressor characteristic curves, all of which vary with corrected engine speed for any particular turbine inlet temperature. For many engines it would be sufficiently precise to let $x$ be a constant irrespective of corrected engine speed; for others it would not, and $x$ itself must also be varied with corrected engine speed, as is $$W_f\theta_2^x/P_3$$

Figures 2, 5, 6:
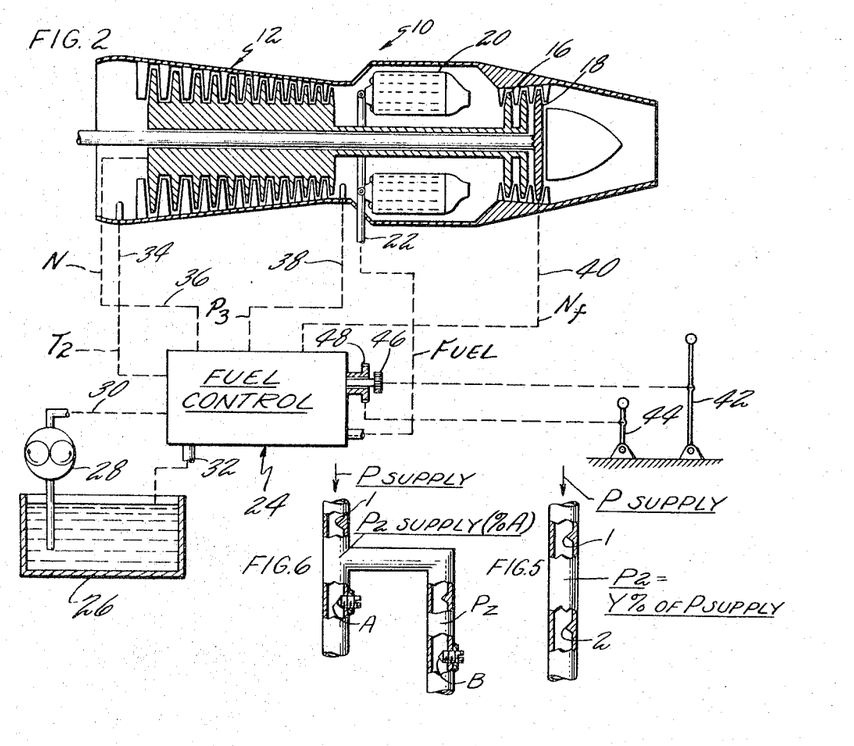
FIG. 2 is a schematic illustration showing a fuel control connected to a free-turbine type of gas turbine engine.
FIG. 5 is a schematic of a hydraulic circuit illustrating a hydraulic multiplication system.
FIG. 6 is a schematic of a hydraulic circuit illustrating an additional multiplication function of a hydraulic multiplication system.

Referring now to FIG. 2 showing a gas turbine engine generally illustrated by numeral 10 having a first section 12, wherein the compressor is driven by turbine section 16. Since the turbine 16 is connected to compressor 12 for driving the same, it is generally referred to as the gas generator turbine and the rotational speed thereof is hereinafter referred to as $N_g$. Turbine 18 illustrates a free turbine which may be adapted to drive a variable load such as a helicopter rotor, propeller, and the like. Since turbine 18 is mechanically disconnected from turbine 16 but is driven by the discharging gases thereof and because it is free or has only an aerodynamic connection with the turbines in the first turbine section, it is generally referred to as the free turbine and the speed thereof is hereinafter referred to as $N_f$. Interposed between the compressor section and the turbine turbine section is the burner section generally indicated by numeral 20. Fuel is injected into the burner section through the fuel manifold 22 which is regulated by the fuel metering section generally indicated by numeral 24 to be described hereinbelow.

Basically, the fuel metering system of the fuel control serves to meter fuel to the engine in an amount commensurate with optimum engine operations while assuring that malfunctions due to surge, overtemperature or rich or lean blow out do not ensue. Fuel is fed to fuel control 24 from reservoir 26 and the pressure thereof is increased by virtue of pump 28 through line 30. The fuel control also contains a drain manifold which discharges excessive fuel or ported fuel to drain via line 32.

The fuel control also contains a computing system which measures certain parameters, computes them in accordance with the control parameters indicated in the above for controlling the fuel metering system. For this purpose, compressor inlet temperature is sensed via line 34, compressor speed ($N_g$) is sensed via line 36, compressor discharge pressure is sensed via line 38 and free turbine speed ($N_f$) is sensed via line 40. It is to be understood that any suitable mechanism for sensing these various operating conditions of the engine is contemplated within the scope of this invention. Power levers 42 and 44 are suitably situated in the cabin of the aircraft and are available to the pilot for setting the speed of the gas generator and the speed of the free turbine in a manner to be described hereinbelow. These control levers also serve to operate various other mechanically movable parts in the fuel control, also to be described hereinbelow. Thus, lever 42 rotates gear 46 which rotates the connecting shaft and lever 44 rotates gear 48 which rotates its connecting rotary shaft.

While the fuel control showing the preferred embodiment is illustrated in connection with a free turbine type of gas turbine engine, it is to be understood that this invention has applications as will become obvious to one skilled in the art in connection with all types of gas turbine engines. As is known in this art, the free turbine can operate at a different speed than the gas generator. By virtue of this fact, it is often desirable to measure $N_f$ as well as $N_g$. If, however, it is desirable to utilize this invention in connection with a solid shaft or a coupled type of gas turbine engine, it would only be necessary to sense the speed of one of the rotating mechanisms within the engine. In this event, the free turbine speed sensor which will be described hereinbelow would not be utilized.

It is also to be understood and will be obvious to one skilled in the art that the terminology of power lever is not particularly limited to the particular lever in the cockpit of the aircraft. Rather, it is intended to cover any linkage connecting the cockpit to the fuel control whether it be referred to as a "go handle," "power lever" or throttle lever or the like.

Figure 3:
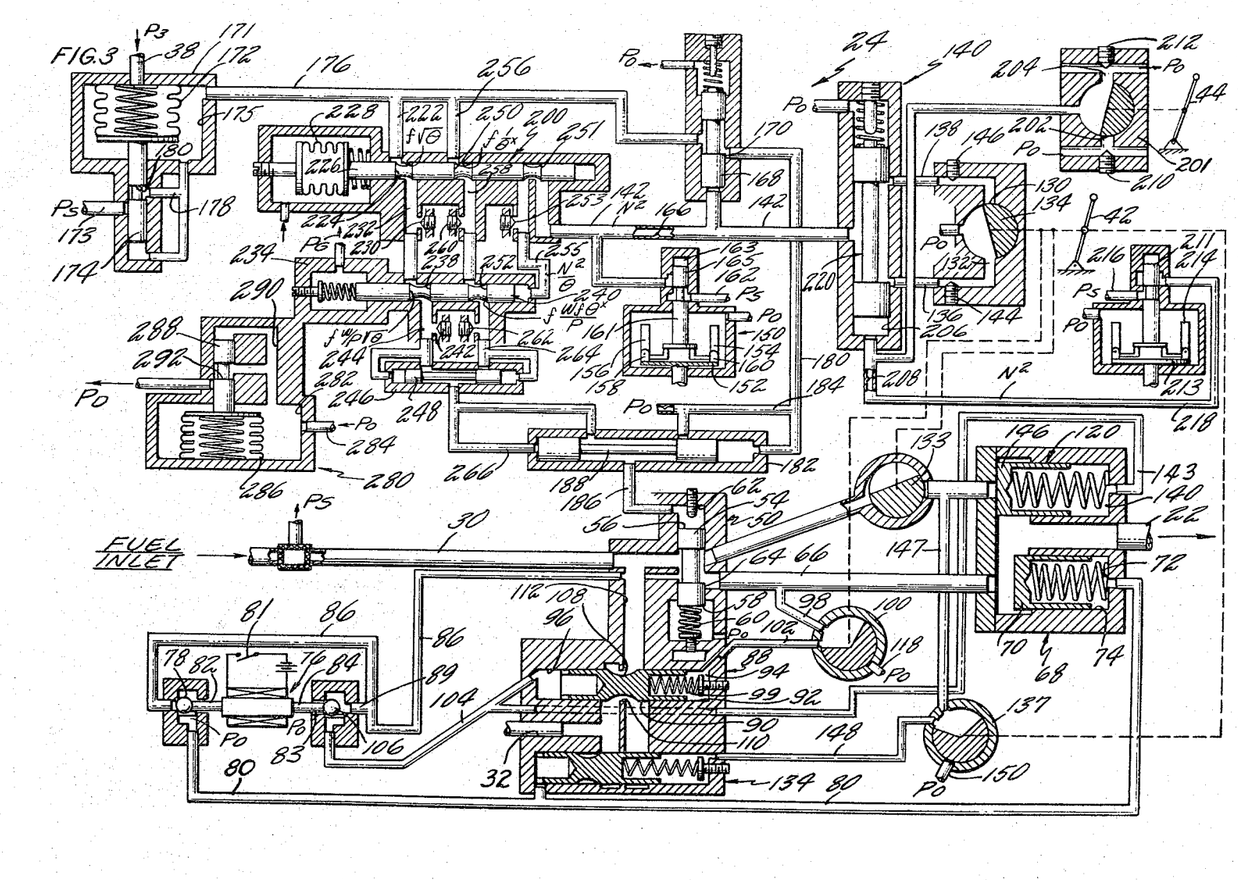
FIG. 3 is a schematic illustration of a fuel control mechanism utilizing this invention.

Now referring to FIG. 3 which is a schematic illustration of a fuel control designated by numeral 24 as having both a fuel metering system and a computing system. Fuel is admitted to the throttle valve generally indicated by numeral 50 via inlet or supply line 30. Throttle valve 50 comprises spool 54 having a fluid reaction end 56 and a combined pressure and a spring reaction end 58. Adjustable spring 60 acts against end 58 while fluid admitted into chamber 62 acts against end 56 and obviously the force generated by the pressure in chamber 62 and the force generated by spring 60 and the pressure acting on end 58 will determine the position of spool 54. Fuel admitted to valve 50 from line 30 is metered by the metering edge 64 on spool 54 into line 22 by way of passage 66 and minimum pressure and shutoff valve generally indicated by numeral 68.

Minimum pressure and shutoff valve 68 comprises value member 70 urged in one direction by the spring 72. When the value of the pressure acting on the underside or the left-hand end of valve member 70 is sufficient to overcome the force exerted by spring 72 as well as the pressure in chamber 74, the valve member is unseated allowing communication between line 66 and line 22.

As noted from FIG. 3, solenoid 76 normally urges ball valve 78 so that line 80 interconnects chamber 74 with drain pressure $P_0$ via clearance around valve stem 82 so that drain pressure and the force of spring 72 act on one end of valve member 70 opposing the force of the metered fuel discharging from line 66. Solenoid 76 may be actuated by the pilot by depressing button 81 which conducts electrical current to actuate the plungers 82 and 84. Plunger 82 in this instance would move to the right seating ball 78 against the drain line, interconnecting line 80 and line 86. This serves to direct pressure upstream of throttle valve 50 behind valve element 70 for urging this valve in the closed position for changing to the emergency engine fuel flow.

So that the displacement of valve 50 and metering edge 64 is directly proportional to the fuel passing therethrough, pressure regulator valve generally indicated by numeral 88 is employed. Valve 88 comprises a spool 90 mounted in cylinder 92 defining a pair of opposing chambers 94 and 96. Disposed in chamber 94 is adjustable spring 99. Fluid upstream and downstream of throttle valve 50 is admitted to chambers 94 and 96 through line 98, valve 100 and line 102 in one instance and line 104, ball valve 106 and lines 86 and 89 in the other instance. It will be noted from the drawing that valve 106 is seated on the left end blocking flow between drain and line 104 while admitting pressure upstream of 50 into chamber 96.

From the foregoing, it is apparent that valve member 90 is subjected to upstream and downstream pressure together with the force exerted by spring 99. This serves to position the metering portion 108 relative to orifice 110. This orifice and metering element 108 serve to bleed pressure fluid upstream of valve 50 through line 112 into line 114 and eventually back to the reservoir, bypassing the throttle valve. Thus, it is apparent that the pressure drop across throttle valve 50 is maintained at a constant value, which value is determined by the force or the strength of spring 99. In the event a deviation of the desired pressure drop is evidenced, valve element 90 will move relative to the metering edge 110 for opening or closing said valve and hence increasing or decreasing the rate of flow therethrough for regulating the pressure drop across valve 50 to hold it constant.

It will be noted that valve 100 which is connected to lever 42 and rotated thereby is normally in the open position. By rotating valve 100, fluid in line 102 is ported to drain via line 118. This decreases the pressure in chamber 94 and since the pressure acting on the other end is at a greater value, it permits the valve to move toward the right in the full open position. This bypasses the fuel around the throttle valve and directs the entire fuel back to drain. This completely starves the engine and prevents the fuel from increasing to a pressure whose valve would be above the structural integrity of the components of the fuel control. Overpressurization is occasioned by virtue of the fact that if the engine windmills by virtue of the air passing over the compressor, the fuel pump driven thereby would begin to overspeed and build up the pressure in line 30. What has just been described is the normal or main fuel regulating means of the fuel control. This fuel control may also include an emergency system comprising shutoff valve 120, emergency throttle valve 133, emergency pressure regulating valve 134 and valves 106, 78 and 137 (note however, that valve 137 is only to shutoff the emergency system).

Of course, the emergency fuel control portion is only actuated in the event that the normal fuel control becomes inoperative for one reason or another. In that event, switch 81 is actuated for energizing solenoid 76 for shifting the position of ball valves 78 and 106. This leads fluid from chamber 96 to drain via lines 104 and 83, leads fluid from chamber 140 to drain via lines 143, 104 and 83 while chamber 74 is connected with high pressure via lines 86 and 80 for directing valve member 72 to the closed position. Valve 133 is opened and is directly coupled to lever 42 for metering fluid to the engine through valve 120 and line 22. By virtue of the fact that the pressure underneath the valve element 146 is greater than both the spring force and the pressure in chamber 140, it shifts to the open position allowing the communication between valve 133 and line 22. Further, it will be appreciated that at this time valve 137 is directed to communicate line 148 to line 147 and allowing normally closed emergency pressure regulating valve 134 to open. This valve then serves to control the pressure drop across valve 133. Now that the fuel regulating system has been described, the next portion of the description will be directed to describing the computing mechanism of the fuel control.

As was mentioned above, the position of spool 54 of throttle valve 50 is positioned by the pressure of the fluid in chamber 62. This pressure is made proportional to the desired amount of fuel which will operate the engine at a scheduled value determined by the fuel computing system. The fuel computing system computes steady state and acceleration schedules as will be described hereinbelow. In accomplishing this, levers 42 and 44 are positioned in the desired position to develop the desired amount of thrust or horsepower necessary to propel the aircraft for its desired operation. Referring now to lever 42 which serves to select the predetermined speed setting of the gas generator by virtue of setting the metering area defined by orifices 130 and 132 of valve 134. This serves to set a desired area which will control the pressure in lines 136 and 138 by bleeding fluid to drain. Ignoring for the moment the valve generally indicated by numeral 140, this pressure, in turn, establishes the pressure in line 142. A pair of adjustable orifices 144 and 146 disposed in lines 136 and 138 respectively, serve to provide the idle and topping $N_g$ limits by virtue of the fact that orifice 130 is closed when lever 42 is set for topping and orifice 132 is closed when lever 42 is set for idle.

From the foregoing it is apparent that valve 134 determines a porting area for establishing a pressure in line 142 which is proportional to the speed error of the gas generator compressor 12. In order to establish a signal to compare the desired speed with actual speed, speed sensor generally indicated by numeral 150 is employed and suitably connected to and driven by compressor 12 for rotating platform 152. The platform contains flyweights 154 and 156 which are pivotally connected to the upstanding members 158 and 160. The arms of the flyweights bear against an end of pilot valve 160. When the flyweights are disturbed from their vertical position resulting from the rotational movement of platform 152, they will either move inwardly or outwardly relative to the rotational axis for positioning valve 160. This, in turn, meters fluid from line 162 to line 142 upstream of fixed restriction 166 proportional to the square of the speed. It will be noted that the pressure in line 142 goes to chamber 163 via annual space 165 made at the lap fit between spool 161 and its cylinder and balances the flyweight force which nulls the valve 161 at the right pressure.

It is apparent from the foregoing that the pressure in line 142 downstream of orifice 166 is a function of the actual speed of the compressor and the desired speed generated by the position of lever 42. This value which is a speed error signal acts on the underside of valve 168 for positioning the metering edge 170.

From the drawing it will be apparent that compressor discharge pressure from line 38 is admitted interally of bellows 172. The free end of bellows 172 acts against pilot valve 174 which serves to regulate pressure in line 176 as a function of compressor discharge pressure. This is accomplished by metering fluid issuing from pressure supply line 173 through passages in spool 174 and into chamber 175 via lines 178. Spool 174 is counterbalanced by the pressure in chamber 175 acting on its underside. Spool 174 translates with respect to the opening 180 until the pressure in chamber 175 acting externally of bellows 172 balances the pressure and the spring acting internally thereof. At the point of equilibrium, the pressure in line 176 is established at the point where it is proportional to compressor discharge pressure plus a constant.

This pressure line 176 is then fed into pilot valve 168 which serves to meter it to line 180. By properly contouring metering edge 170, this pressure is then made a function of the desired fuel flow or $W_f$ for steady state operation. The fluid metered by metering edge 170 is then fed into selector valve 182 via branch line 184 where it is admitted to chamber 62 through line 186 when spool 188 is in the righthand position.

The position of lever 44 serves to generate a signal which will produce a value for establishing the speed at which the free turbine is desired to operate. This is accomplished by the rotation of valve 201 which establishes an area across orifices 202 and 204 venting fluid out of chamber 206 formed in valve 140. This serves to control the pressure drop across restrictor 208 for establishing the desired $N_f$. Adjustable restrictions 210 and 212 downstream of orifices 202 and 204 respectively establish the minimum and maximum speed of the free turbine. The pressure upstream of restrictor 208 is proportional to the square of the speed of the free turbine which is established by pilot valve 210. This valve operates substantially the same as valve 150 by coupling platform 213 to the free turbine shown by line 40 in FIG. 1 so that flyweights 214 responding to this speed positions pilot valve 211. This meters fluid issuing from servo supply line 216 into line 218 in such a manner as to make this pressure proportional to the free turbine speed squared. Hence, the pressure in chamber 206 is established as being the difference between the actual speed generated by pilot valve 211 and the desired speed established by the position of lever 44.

From the foregoing it is apparent that spool 220 is positioned as a function of speed error for modifying the pressure in line 142. This has the effect of resetting the position of spool 168 and hence establishing a new value for the setting of the gas generator or $N_g$. What has just been described is the steady state operation as established by the computing mechanism of the fuel control. The next portion of the description will describe the established acceleration surge and overtemperature schedule of the computing mechanism.

As noted from FIG. 3, pressure proportional to compressor discharge pressure is admitted to temperature responsive valve generally indicated by numeral 200 through line 222. The metering edge 224 formed on spool 226 is made to vary as a function of the square root of $\theta_2$. Compressor inlet temperature admitted to act externally of bellows 228 through line 34 causes it to expand or contract for positioning spool 226 as a function of compressor inlet temperature. By virtue of positioning metering edge 224, the pressure drop across restrictor 230 which bleeds fluid from line 232 to drain is controlled and a multiplication is effectuated so that the pressure in line 232 is made proportional to compressor discharge pressure and a function of the square root of $\theta_2$. This pressure is then admitted to valve 234 which is positioned as a function of the speed $N_g^2/\theta_2$ in the manner to be described hereinbelow. Metering edge 238 of spool 240 is made to define an area which is a function of $W_f/P_3\sqrt{\theta_2}$. The combination of this area and the area established by fixed restrictor 242 serves to effect another multiplication so that the pressure in line 244 is made proportional to the desired fuel flow $W_f$.

The pressure in line 244 is then admitted into selector valve 246 to act on the left end of spool 248 which in this instance is the desired $W_f$ for establishing the surge limit of the schedule. The pressure acting on the right end of spool 248 is the limit in terms of $W_f$ for the temperature limiting portion of the acceleration schedule. This is established by metering lands 250 of spool 226 and 252 of spool 240 in the manner described immediately below.

Fluid pressure proportional to compressor discharge pressure evidenced in line 176 is admitted to the metering land 250 through line 256. This metering land is made a reciprocal function of $\theta_2$ raised to the $x$ power which $x$ power is established according to the mathematical computations noted above. Hence, the pressure established in line 258 is a multiplication by virtue of metering edge 250 and fixed restriction 260. The area defined by metering edge 250 varies as a function of compressor discharge pressure times a function of $1/\theta_2^x$. This fluid is then admitted to valve 234 where metering edge 252 in conjunction with fixed restriction 262 serves to effect another multiplication. Since the area defined by metering edge 252 is a function of $W_f/P_3$ times $\theta_2^x$, the pressure in line 264 is proportional to the desired fuel flow ($W_f$) for limiting temperature.

This fluid in line 264 is then admitted to selector valve 246 to act on the right-hand end of spool 248. The difference between the two values of the pressures acting on either end of spool 248 determines the position of spool 248 to either the left or right for admitting fluid into line 266. Hence, the pressure in line 266 is either the desired $W_f$ surge or the desired $W_f$ temperature depending on the position of selector spool 248 of selector valve 246. This pressure is then admitted to act on the left end of spool 188. As mentioned above, steady state pressure proportional to the desired fuel flow ($W_f$) acts on the right-hand end. The difference between the two values will position spool 188 to either the left or right. The pressure proportional to the desired steady state $W_f$ or the desired surge $W_f$ or the desired overtemperature $W_f$ is then admitted to chamber 62 for controlling the position of spool 54 of throttle valve 50.

Since it is desirable to compute the terms of the parameters in absolute values rather than gauge pressure values, absolute pressure control 280 is employed. Fluid from the various computating valves and restrictions which is eventually ported to drain is first admitted into chamber 282 via line 284 where it acts externally of bellows 286. Bellows 286 is evacuated and has its free end operatively connected to one end of spool 288. Since the other end of spool 288 is counterbalanced by the pressure admitted thereto through line 290 metering edge 292 thereof will assume a position to establish the drain pressure for establishing an absolute value datum line. Note that the pressure level is set equal to the spring constant established in valve 171. Therefore, it will be appreciated that the datum line is equivalent to an absolute value so that the pressure control valves use a zero pressure datum rather than a gauge pressure datum.

Figure 7:
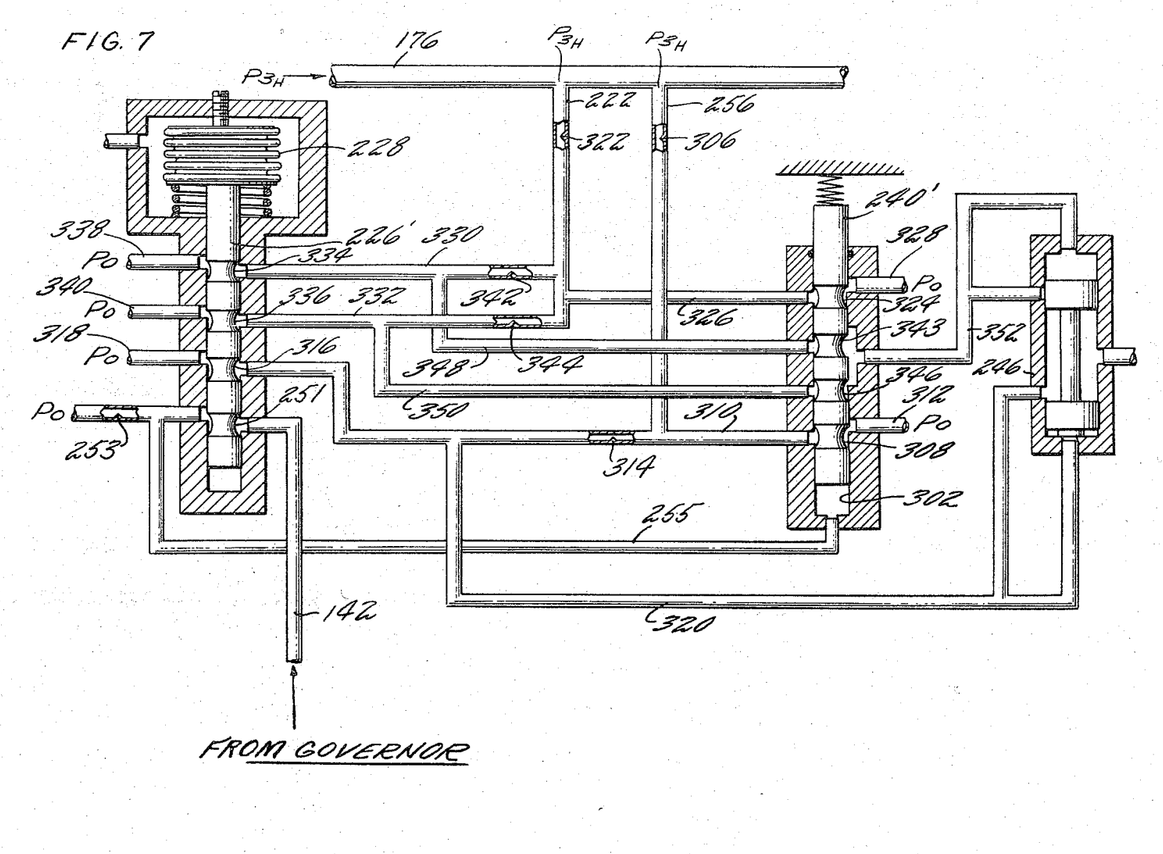
FIG. 7 is a partial schematic showing a modification of FIG. 3.

As was pointed out in the above, the exponential $x$ for certain engines must be varied with the corrected engine speed. Mechanism for accomplishing this is shown in FIG. 7. Basically the acceleration computing mechanism shown in FIG. 3 may be slightly modified to perform this function. This may be accomplished by adding a single land to spool 226 of valve 200 and two lands to spool 240 and slightly rearranging the fluid connecting lines. Like numeral references correspond to like parts in the various drawings. Spool 240' like spool 240 of FIG. 3 is positioned as a function of $N^2/\theta_2$. This is achieved by developing pressure acting on the underside of spool 240' to a value proportional to this term by directing fluid from line 142 into line 255 by passing it through orifice 251 which modifies the pressure from line 142. Since the pressure upstream of restriction 166 is a function of the speed of the governor (see FIG. 3) and since the area defined by metering edge 251 is a function of temperature, the computing system serves to develop pressure in line 255 and chamber 302 to be equivalent to a function of $N^2/\theta_2$.

In order to obtain the surge limit, pressure proportional to $P_3$ is bled from line 176 through line 256 and restriction 306. The pressure downstream of fixed restriction 306 is controlled by the metering edge 308 formed on spool 240' which communicates line 256 to drain via lines 310 and 312. Metering edge 308 is designed to cooperate with its metering port so that it defines a metering area which is a function of $W_f/P_3\sqrt{\theta_2}$. The cooperating between metering edge 308 and fixed restriction 306 effectuates a multiplication for establishing the pressure intermediate thereof to be a function of $W_f/\sqrt{\theta_2}$. The pressure across fixed restriction 314 disposed in line 310 is controlled by metering edge 316 formed on spool 226' which serves to port fluid to drain via line 318 for establishing the proper pressure level in the line intermediate thereof. The metering edge 316 cooperates with its registering port to establish an area which is a function of the $\sqrt{\theta_2}$. This variable restriction together with the fixed restriction 314 cooperate in such a manner as to effectuate a still further multiplication of the $W_f/\sqrt{_2}$ pressure to obtain a pressure which is proportional to the desired fuel flow $W_f$ which value is the surge limit established by the computing system.

This pressure is then bled off branch line 320 and directed to valve 246.

The next portion of the description will be concerned with the mechanism for generating the temperature limit signal to valve 246. Fluid whose pressure is equivalent to compressor discharge pressure is bled from line 176 through line 222 and restriction 322 and directed through line 326 to metering edge 324 formed on spool 240'. The area defined by metering edge 324 cooperating with its registering port is made a function of $W_f\theta_2^x/P_3$. This metering edge position serves to communicate line 326 with drain line 328 for controlling the pressure drop across restrictor 322 for developing a pressure intermediate at a value proportional to $W_f\theta_2^x$. A pair of parallel disposed branch lines 330 and 332 bleed fluid from line 222 to metering edges 334 and 336, respectively, formed on spool 226'. The areas of metering edge 334 and 336 cooperating with their respective ports vary as a function of $1/\theta_2^x$ where the $x$ power corresponds to different values. Thus for illustration purposes, assume that the area of metering edge 334 is defined as $1/\theta_2^{x1}$ and the area of metering edge 336 is defined as $1/\theta_2^{x2}$. These area, varying as a function of compressor inlet temperature as sensed by bellows 228, communicate pressure in lines 330 and 332 with drain lines 338 and 340, respectively. This serves to control the pressure drops across fixed restrictors 342 and 344, respectively. Consequently, the cooperation between variable restriction 334 and fixed restriction 342 effectuates a multiplcation for developing the pressure in line 330 which is a function of fuel flow $W_f$ corresponding to $\theta_2^{x1}$. Likewise the pressure in line 332 established by variable restriction 336 and the fixed restriction 344 is made a function of the desired fuel flow in accordance with $\theta_2^{x2}$. The pressure in lines 330 and 332 are bled to metering edges 343 and 346 formed on spool 240', respectively, through lines 348 and 350, respectively. Metering edges 343 and 346 are contoured so that they will define in cooperating with the adjacent port an area which is a function of $N^2/\theta_2$. These metering edges serve to direct fluid from lines 348 and 350 into line 352 to give the proper temperature limit schedule for $N^2/\theta_2$, and therefore the proper selection of $\theta_2^x$ has been made.

From the foregoing, it is apparent that one end of the spool disposed in valve 246 is subjected to the scheduled overtemperature limit and the other to the scheduled surge limit, and the least pressure value of the two is transmitted to spool 188 of valve 182 shown in FIG. 3, where it is compared with the steady state signal.

OPERATION

Figure 4:
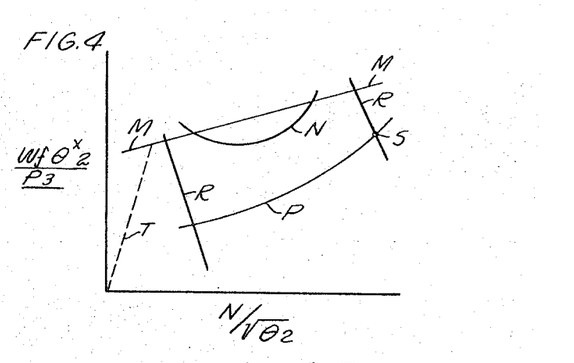
FIG. 4 is a graphical illustration representing the operational characteristics of a fuel control made in accordance with this invention.

The operation of the fuel control can best be described by referring to FIG. 4 which is a graphical representation of the operation of the engine. It will be noted that the operation can be defined by the use of the control parameter derived hereinabove where $$\frac{W_f}{P_3} \cdot \theta_2^x$$

is the ordinate, and $N^2/\theta_2$ the abscissa, which is a rewritten expression for $N/\sqrt{\theta_2}$. Curve M represents the temperature limit and curve N represents the surge limit of the acceleration schedule. Curve P represents the steady state engine operation and the plurality of curves R represents an infinite number of droop lines. Assuming that it is desirable to operate the engine at the speed indicated by numeral S which intersects the steady state line and the droop line and that the engine is just put in the on position. The pilot will cause levers 42 and 44 to rotate for establishing this condition which will automatically be achieved by the computing mechanism of the fuel control.

Immediately, fuel through line 30 will be fed to the minimum pressure and shutoff valve 68 and when its value overcomes the closing force thereof it will be injected into line 22 from where it is delivered to the burners. Simultaneously a signal generated by the steady state control mechanism will cause the valve 50 to move towards wide open position. This condition is represented by line T. Immediately upon intersecting line M the temperature computing mechanism begins to take over the control of throttle valve 50 for limiting the fuel, which is accomplished by valves 200 and 234 and speed sensor 150 together with the compressor discharge sensor 171.

The pressure established in line 176 is made proportional to compressor discharge pressure and is fed to line 256 to valve 200. Valve 200 which is responsive to compressor inlet temperature positions metering edge 250 metering fluid into line 258. By virtue of the area defined by metering edge 250 with respect to the cooperating port which area is a function of $\theta_2^x$ and the fixed restriction 260 a multiplication is effectuated so that the pressure in line 258 is made proportional to $P^3/\theta_{2x}$. This pressure is then fed to valve 234 where metering edge 252 in conjunction with the cooperating port defines an area which varies as a function of $W_f\theta_2^x/P_3$. It will be appreciated that the position of this value is varied as a function of $N_g^2/\theta_2$ which has been established by metering edge 251 of spool 226. It will be appreciated that pressure generated by pilot valve 161 is made proportional to $N_g^2$, which, in turn, is fed to line 142 and admitted to metering edge 251. By virtue of metering edge 251 and fixed restriction 253 a division is effectuated so that the pressure in line 255 is made proportional to $N^2/\theta_2$ which, in turn, acts on the left end of spool 240.

By virtue of the relationship of metering edge 252 and fixed restriction 262 another multiplication is effectuated so that the pressure in line 264 which, in turn is then admitted on the right end of spool 248 is made proportional to desired $W_f$. This causes a hydraulic signal to be delivered through line 266 to act on the left end of spool 188 for causing it to shift and in turn alter the pressure in chamber 62. Owing to this pressure change, valve 50 is moved to a closing position for reducing the amount of fuel flow to maintain the limit defined by line M.

At the point where line M intersects line N the surge limit of the acceleration schedule will take over the control. This is effectuated by the mechanism enumerated in connection with the temperature limit except different metering edges are employed. Here the fluid pressure proportional to compressor discharge pressure is admitted to metering edge 224 via line 222. This metering edge in cooperation with the cooperating port defines an area which is a function of the $\sqrt{\theta_2}$. This meeting edge together with fixed restriction 230 effectuates a multiplication for establishing a pressure in line 232 which is a function of $P_3\sqrt{\theta_2}$. This pressure in turn is fed to metering edge 238 which together with its cooperating port define an area which is a function of $W_f/P_3\sqrt{\theta_2}$. This area together with the area established by restrictor 242 effectuates still another multiplication for establishing the pressure in line 244 to be proportional to desired $W_f$. This fluid is then admitted on the left end of spool 248 which, in turn, communicates a pressure signal to line 266 for adjusting the position of spool 188. This, in turn, causes the fluid in chamber 62 to be modified to position throttle valve in accordance with curve N.

At the point where curve N intersects once again line

M the temperature control will once again take over in the same manner as described above.

When line M intersects droop line R the governor of the steady state operation will take control. The angle of the droop line is established by the component parts of the governor together with its attendant controlling mechanism.

From FIG. 4 it will be appreciated that fuel flow will be reduced until the control has established an operation condition indicated by the point S. This is the controlling point established by the computing mechanism of the fuel control.

As has been mentioned above, the free turbine speed is set by the pilot by virtue of the position of lever 44. The gas generator produces sufficient power to maintain the selected $N_f$. Should the free turbine run off speed, in the overspeed or underspeed direction, it will by virtue of the speed sensing mechanism cause valve 140 to readjust. This has the effect of resetting the speed of the gas generator an amount sufficient to change the power generated thereby for producing the necessary energy of the working fluid passing through the engine for driving the free turbine at the preselected speed.

THE HYDRAULIC MULTIPLICATION SYSTEM

In order to establish the control pressure, it was necessary in several instances to perform a multiplication. This multiplication was effectuated by defining an area of a metering orifice to vary as a predetermined function. The following description is illustrative of how the hydraulic multiplication is effectuated.

The hydraulic multiplying device can be readily understood when thought of as a device which produces a pressure which is a percentage of some supply pressure. This device consists of flowing fluid through two orifices in series as shown in FIG. 5.

If P supply represents one quantity and the $y$ percent (%) represents another, then $P_2$ represents the product of these two and a multiplication has been achieved; where P represents the pressure value of the fluid.

As P supply varies, $P_2$ will vary as $y\%$ of P supply when the area of the orifice remains constant. As the area of orifice 1 or 2 is varied, the percentage $y$ will vary. It can be seen now that variations in the quantities to be multiplied can be controlled by either varying the P supply or the areas.

A further multiplication can be accomplished by next using $P_2$ as the supply pressure of another series of orifices as cascaded in FIG. 6.

This schematic represents the multiplication:

(1)  P supply (percent $A$) = $P_2$
(2)  $P_2$ (percent $B$) = $P_z$ $$P \text{ supply (percent } A)(\text{percent } B) = P_z$$

Now substitute: $P_3$ (compressor discharge pressure) = P supply, $\sqrt{\theta_2}$ (function of the compressor inlet temperature) =

$$\text{Percent } A, \frac{W_f}{P_3\sqrt{\theta_2}}$$

(function of the engine speed) = %B and $W_f$ (engine fuel flow) = $P_z$.

Therefore:

$$P_3(\sqrt{\theta_2})\left(\frac{W_f}{P_3\sqrt{\theta_2}}\right) = W_f$$

In the interest of obtaining accuracy of the multiplication system, it may be necessary to design the orifices such that the cooperating orifices effectuating the multiplication have matching Reynolds number. This may be accomplished by designing the cooperating orifices such that when the area of the orifices is at the midpoint of the control range, these orifices will be so shaped and sized so that the Reynolds number of each of the orifices match each other. Also in the interest of obtaining accuracy of multiplication, the flow through metering edges 224 and 250 will be much greater than that flowing through metering edges 238 and 252.

While this invention was illustrated utilizing a hydraulic type of computation system for a fuel control, it will be obvious to one skilled in the art that other mediums such as pneumatics or electronics and the like may suitably be adapted to practice this invention. What is significant and contemplated by the scope of this invention is the teaching of a new control parameter $W_f\theta_2{}^x/P_3$ vs. $N_g{}^2/\theta_2$ for controlling a gas turbine engine. To this end and referring now more specifically to FIG. 8, block 400 represents a suitable speed sensing device receiving an input speed signal and converting it to a function of the square of the speed ($N^2$). This signal is then fed into block 402 representing a divider which also receives a second input signal $\theta_2$ responsive to the temperature at the inlet of the compressor. Here these two signals are divided to produce an output signal equal to a function of $N^2/\theta_2$. This signal then becomes the input signal to the function generator illustrated by block 404. It converts the signal to a value which is a function of $W_f/P_3\sqrt{\theta_2}$. This signal is then multiplied in the multiplication box represented by numeral 406 which multiplies this value by a signal equivalent to the function of $P_3\sqrt{\theta_2}$ which signal is established by block 408. Block 408 which represents a multiplication device receives a signal which is a function of compressor discharge pressure $P_3$ and $\sqrt{\theta_2}$ and multiplies these two signals to generate the $P_3\sqrt{\theta_2}$ signal. Block 406 multiplying these two values, then develops a $W_f$ signal which is proportional to the amount of fuel established by the computation mechanisms. This signal is then fed to a gate type of mechanism which senses another $W_f$ signal developed by block 412. Gate mechanism 410 sensing these two input signals delivers the lower value of the two to a second gate mechanism 414. Block 412 represents a multiplier which multiplies the two input signals $P_3/\theta_2{}^x$ and $W_f\theta_2{}^x/P_3$. The $W_f\theta_2{}^x/P_3$ signal is developed by function generator illustrated by block 416, as follows. Function generator 416 responding to the input signal $N^2/\theta_2$ developed by divider 402 modifies it to a value equal to a function of $W_f\theta_2{}^x/P_3$ which is then transmitted to multiplier 412. The second signal $P_3/\theta_2{}^x$ which is multiplied by multiplier 412 is generated by function generator 420 by combining two input signals $P_3$ and $\theta_2{}^x$ (generated by the function generator 422). The function generator 422 receives two input signals $\theta_2$ and $x$ (generated by function generator 424). The function generator 424 serves to convert $N^2/\theta_2$ signal developed by divider 402 into the exponential $x$ power. These two signals received by function generator 422 in turn establishes the signal $\theta_2{}^x$ which is then combined with the $P_3$ signal in function generator 420 for producing the $P_3/\theta_2{}^x$. The multiplication taking place in the multiplier 412 develops the $W_f$ signal which is then transmitted to the gate mechanism 410. Gate mechanism 414 then compares the two $W_f$ signals and transmits the least value of the two to block 428 which represents the metering valve for delivering sufficient fuel to the engine in accordance with the value determined by the computation system. The second $W_f$ signal fed into the gate mechanism 414 is developed by multiplier 430 which multiplies $P_3$ and $W_f/P_3$ (developed by function generator 432). Function generator 432 serves to combine a signal which is proportional to the power lever setting and a signal which is proportional to speed for producing the $W_f/P_3$ signal. This signal is then in turn transmitted to multiplier 430 which multiplies $P_3$ and $W_f/P_3$ for developing the $W_f$ signal.

Figure 8:
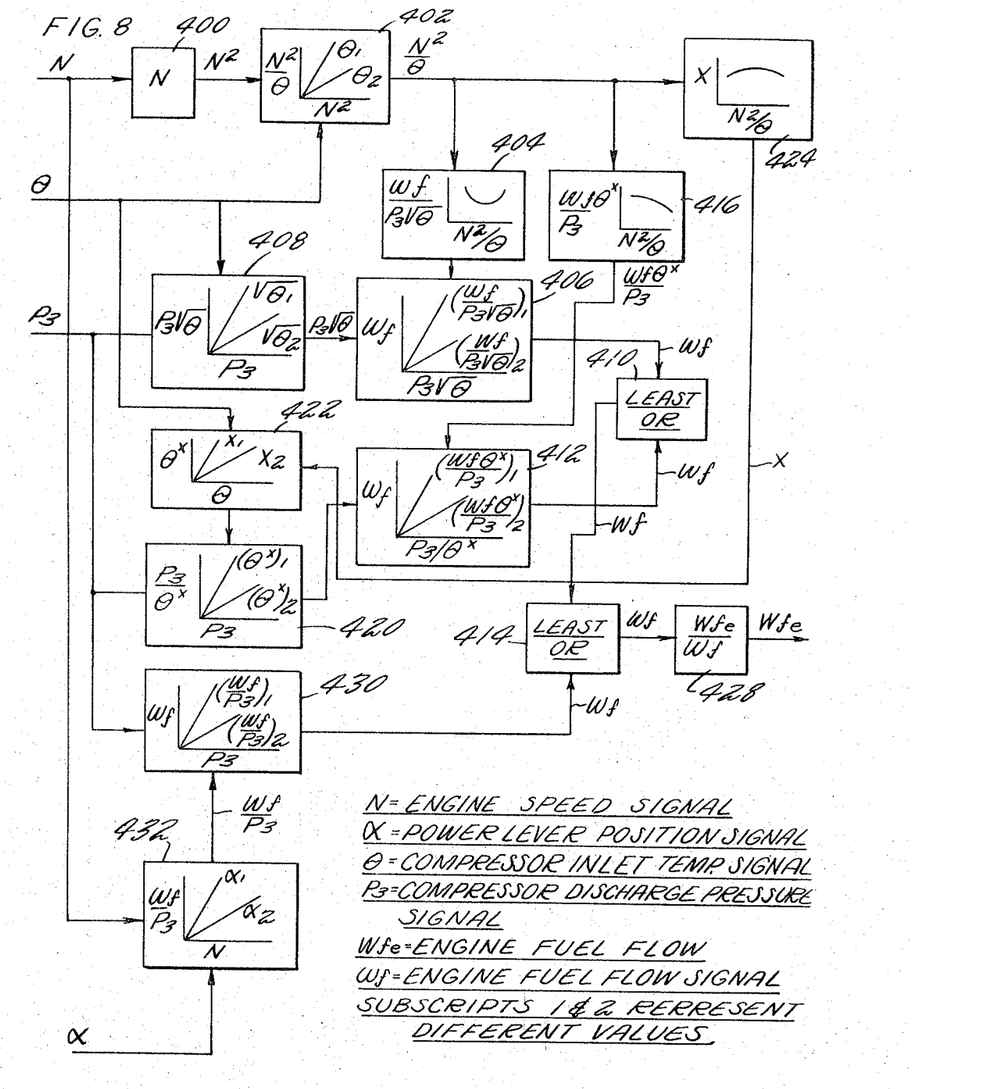
FIG. 8 is a block diagram illustrating the invention.

From the foregoing, it is apparent that function generator 432 and multiplier 430 develop the scheduled steady state $W_f$ value for controlling the engine during the steady state operation. Multiplier 412, function generator 416, function generator 422, multiplier 420 serve to generate a $W_f$ signal which establishes the overtemperature limit for the acceleration schedule. Function generator 424 serves to bias this signal as a function of speed. Multipliers 408 and 406, function generator 404 serve to generate a $W_f$ signal for limiting surge of the acceleration schedule.

For a clearer understanding of the mechanism represented by the various blocks in FIG. 8, a graphical illustration is shown therein to illustrate the desired function of each. For the sake of simplicity and convenience and because the graphical illustrations are obvious to one skilled in the art, a description of each is omitted from herein.

What has been described is a fuel control that assures accurate fuel metering to assure optimum engine performance and assuring that malfunctions due to surge, overtemperature and rich and lean flameout do not ensue. The fuel control monitors preselected engine operating conditions and computes them to produce a signal ($W_f$) whose value is proportional to the desired fuel flow. The $W_f$ signal is computed as a function of $$W_f \theta_2^x / P_3$$

and $N_g^2/\theta_2$. By virtue of this parameter, the heretofore customary three-dimensional cam has been eliminated which has led to the simplification of the fuel control resulting in a less complex and relatively less expensive control. Also, of relative importance is the fact that the temperature limit and the surge limit are each independently adjustable.

It should be understood that the invention is not limited to the particular embodiments shown and described herein, but that various changes and modifications may be made without departing from the spirit or scope of this novel concept as defined by the following claims.

I claim:

1. A fuel control for a turbine type of power plant having a compressor, a burner and a turbine driven by the exhaust gases of said burner for driving said compressor, a source of fuel under pressure, conduit means interconnecting said source and said burner, valve metering means in said conduit means varying the flow therethrough, actuation means for varying said metering means, computing means serving to control said actuating means including a pair of serially connected valves each having at least one metering land, at least one of said metering lands defining an area whose value varies as a function $1/\theta^x$, and the other of said metering lands defining an area whose value varies as a function of the expression $W_f / P\theta^x$ where $W_f$=rate of fuel
$P$=compressor discharge pressure
$\theta$=compressor inlet temperature $$x = \frac{T_4}{\Delta T_b} - \frac{T_3}{\Delta T_b} \frac{K-1}{2K\eta} \left\{ \frac{2\frac{dW_a}{W_a}}{\frac{dP}{P}} + 1 \atop \frac{dW_a}{W_a} + 1 \right\} - 1$$

where $T_4$=turbine inlet temperature
$\Delta T_b$=burner temperature rise
$T_3$=compressor discharge temperature
$K$=ratio of specific heat of the working medium
$\eta$=compressor efficiency $\dfrac{\dfrac{dW_a}{W_a}}{\dfrac{dP}{P}}$ =slope of the speed line of the compressor in a graph plotting the pressure ratio versus the air flow of the compressor 2. A fuel control for a turbine type of power plant having a compressor, a burner and a turbine driven by the exhaust gases of said burner for driving said compressor, a source of fuel under pressure and a drain, conduit means interconnecting said source and said burner, valve metering means in said conduit means for regulating the flow therethrough, actuating means for varying said metering means, control means including hydraulic conducting passage means, a pair of serially connected valves each having at least one metering land in said passage means, one of said metering lands defining an area whose value varies as a function of $1/\theta^x$, and the other of said metering lands defining an area whose value varies as a function of the expression $W_f/P\theta^x$ where $W_f$=rate of fuel
$P$=compressor discharge pressure
$\theta$=compressor inlet temperature $$x = \frac{T_4}{\Delta T_b} - \frac{T_3}{\Delta T_b} \frac{K-1}{2K\eta} \left\{ \frac{2\frac{dW_a}{W_a}}{\frac{dP}{P}} + 1 \atop \frac{dW_a}{W_a} + 1 \right\}$$

where $T_4$=turbine inlet temperature
$\Delta T_b$=burner temperature rise
$T_3$=compressor discharge temperature
$K$=ratio of specific heat of the working medium
$\eta$=compressor efficiency $\dfrac{\dfrac{dW_a}{W_a}}{\dfrac{dP}{P}}$ =slope of the speed line of the compressor in a graph plotting the pressure ratio versus the air flow of the compressor and a fluid connection interconnecting the passage means, at a point between the metering lands, with said drain and a fixed restriction in said fluid connection.

3. A fuel control for controlling a turbine type of power plant having a turbine, a combustion section, a compressor driven by said turbine, a source of fuel under pressure, connection means interconnecting said source and said combustion section, means for measuring compressor discharge pressure for producing a first hydraulic signal,
means for measuring compressor inlet temperature for producing a second hydraulic signal,
means for measuring compressor rotational speed for producing a third hydraulic signal,
means for combining said first, second and third signals to establish a surge and acceleration schedule according to the equation of $W_f \theta^x / P$ where $W_f$=weight of fuel flow in pounds per hour $\theta$ = compressor inlet temperature
$P$ = compressor discharge pressure $$x = \frac{T_4}{\Delta T_b} - \frac{T_3}{\Delta T_b} \frac{K-1}{2K\eta} \left[ \frac{2\frac{\frac{dW_a}{W_a}}{dP}+1}{\frac{\frac{dW_a}{W_a}}{dP}+1} \right] - 1$$

where $T_4$ = turbine inlet temperature
$\Delta T_b$ = burner temperature rise
$T_3$ = compressor discharge temperature
$K$ = ratio of specific heat of the working medium
$\eta$ = compressor efficiency $\dfrac{\frac{dW_a}{W_a}}{dP}$ = slope of the speed line of the compressor in a graph plotting the pressure ratio versus the air flow of the compressor means for varying the value of the exponent $x$ as a function of the rotational speed of the compressor.

4. A fuel control for a turbine type of power plant having a compressor, a burner and a turbine receiving the discharge gases of the burner for driving the compressor, means for establishing the acceleration schedule for the engine so as to prevent surge and overtemperature of the engine independently of each other, said means including a first valve responsive to compressor discharge pressure for establishing a first hydraulic signal, a second valve having first and second metering means located in parallel to each other but serially connected to said first valve for modifying said first hydraulic signal and producing a second and third hydraulic signal, said second valve being responsive to compressor inlet temperature, a third valve responsive to corrected compressor speed having a first metering means serially connected to said first metering means of said second valve and a second metering means serially connected to said second metering means of said second valve each modifying said second and third hydraulic signals for producing a fourth and fifth hydraulic signal, said first and second metering means of said third valve being parallelly disposed relative to each other, and a selector valve connected to the first and second metering means of said third valve for selecting either the fourth or fifth hydraulic signal.

5. A fuel control as defined in claim 4 wherein
said second hydraulic signal is a function of the square root of $\theta$
where $\theta$ = compressor inlet temperature
said third hydraulic signal is a function of $1/\overline{\theta^x}$ where
$x$ equals a thermodynamic value of the power plant working medium
said fourth hydraulic signal is a function of $W\sqrt{\theta}/P$
where
W is weight of fuel in pounds per hour
P is compressor discharge pressure
and said fifth hydraulic signal is a function of $W\theta^x/P$.

References Cited by the Examiner

UNITED STATES PATENTS

| | | | |
|---|---|---|---|
| 2,668,416 | 2/1954 | Lee | 60—39.28 |
| 2,846,846 | 8/1958 | Mock | 60—39.28 |
| 2,933,130 | 4/1960 | Wright et al. | 60—39.28 X |
| 2,933,887 | 4/1960 | Davies | 60—39.28 X |
| 3,025,670 | 3/1962 | Russ | 60—39.28 |
| 3,032,986 | 5/1962 | Wright | 60—39.28 |
| 3,076,312 | 2/1963 | Haigh | 60—39.28 |
| 3,098,356 | 7/1963 | Joline | 60—39.28 |
| 3,152,444 | 10/1964 | Peczkowski | 60—39.28 X |

JULIUS E. WEST, *Primary Examiner.*